J. F. O'CONNOR.
SHOCK ABSORBER FOR VEHICLES.
APPLICATION FILED SEPT. 14, 1917.
1,290,320.
Patented Jan. 7, 1919.
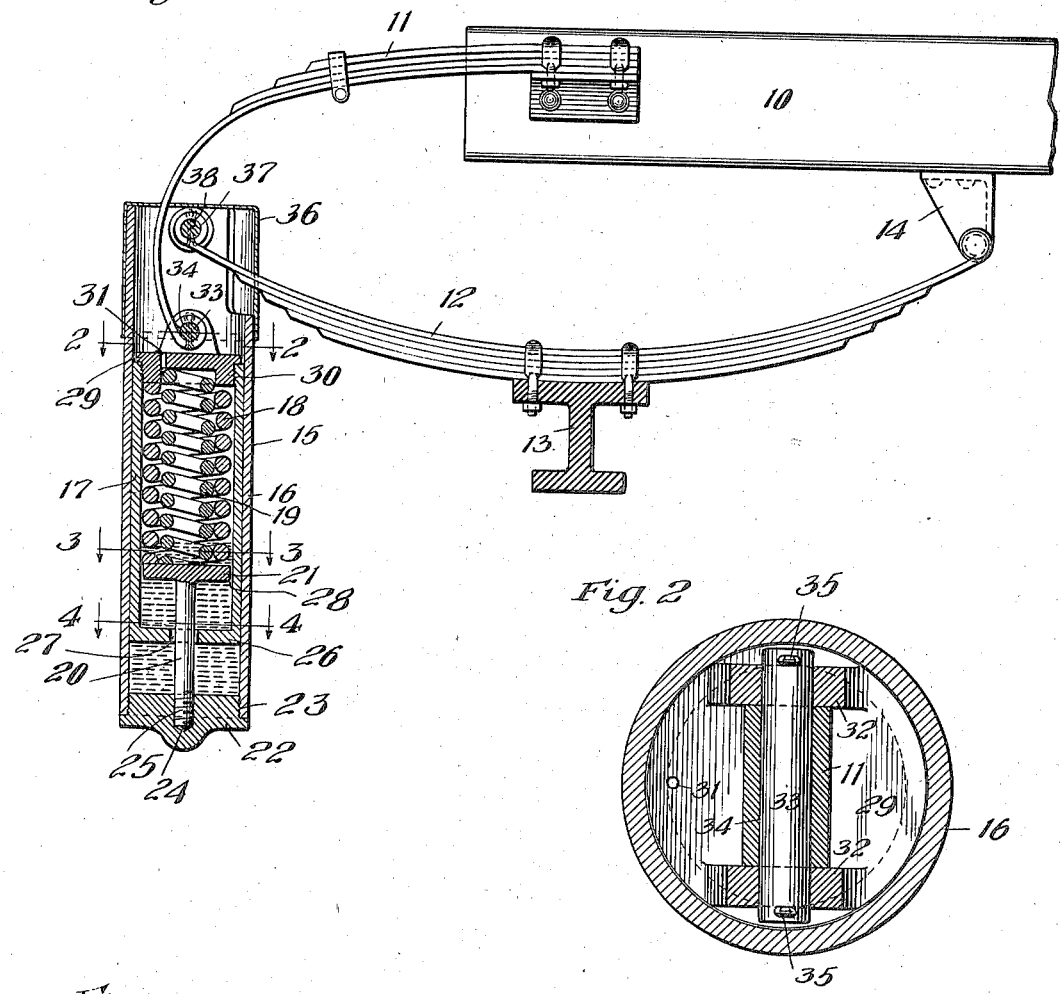
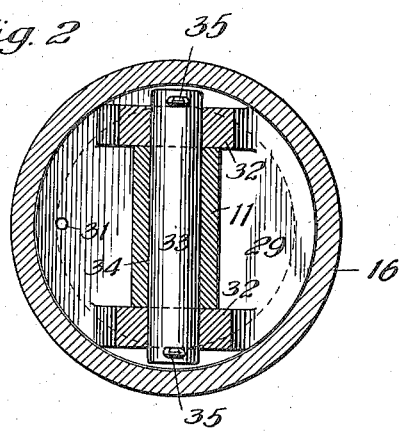
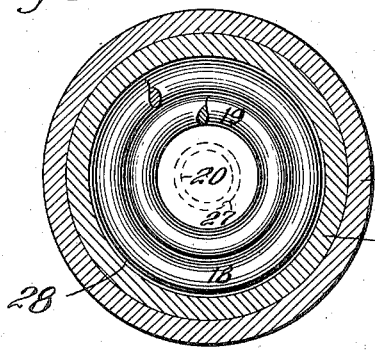
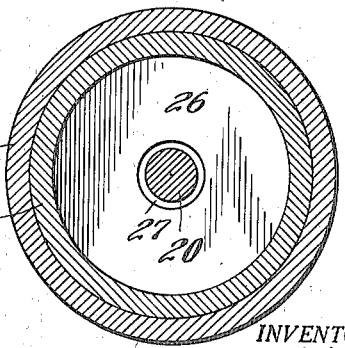
INVENTOR.
John F. O'Connor
BY
ATTORNEY

UNITED STATES PATENT OFFICE.

JOHN F. O'CONNOR, OF CHICAGO, ILLINOIS, ASSIGNOR TO WILLIAM H. MINER, OF CHAZY, NEW YORK.

SHOCK-ABSORBER FOR VEHICLES.

1,290,320.     Specification of Letters Patent.     Patented Jan. 7, 1919.

Application filed September 14, 1917. Serial No. 191,485.

*To all whom it may concern:*

Be it known that I, JOHN F. O'CONNOR, a citizen of the United States, residing at Chicago, in the county of Cook and State of Illinois, have invented a certain new and useful Improvement in Shock-Absorbers for Vehicles, of which the following is a full, clear, concise, and exact description, reference being had to the accompanying drawings, forming a part of this specification.

My invention relates to shock absorbers for vehicles, and in the embodiment illustrated in the drawings is more particularly designed for automobiles.

The object of my invention is to provide an efficient, cheap and simple shock absorbing device for vehicles.

In the drawings forming a part of this specification, Figure 1 is a vertical central longitudinal section of a vehicle shock absorber embodying my invention shown in connection with vehicle springs and adjacent parts; Fig. 2 is an enlarged cross section on line 2—2 of Fig. 1; Fig. 3 is an enlarged cross section on line 3—3 of Fig. 1; and Fig. 4 is an enlarged cross section on line 4—4 of Fig. 1.

Referring to the drawings, the numeral 10 indicates the frame of a vehicle, as for instance an automobile, only the rear portion thereof being shown; 11 a body spring suitably secured thereto; 12 a running gear spring suitably secured to the axle shown in cross section at 13 near its central portion and at one end to the body frame by means of the bracket 14. The springs shown in the drawing are of a usual type and in a common arrangement for the rear end springs of a vehicle. The shock absorbing member is indicated by the numeral 15 and includes an outer casing 16 and inner casing 17, the outer and inner coils of springs 18 and 19 respectively contained in the inner casing 17, and a piston rod 20 having a head 21. The outer and inner casings are hollow and perferably cylindrical in shape, the outer casing being provided at its lower end in the position of the device as shown in the drawings with a closure member or plug 22 which may be secured within the casing by the interengaging threads provided on the plug and casing as indicated at 23. The plug 22 is provided with a recess 24 to receive the end 25 of the piston rod 20. The inner casing 17 is closed at its lower end by the preferably integral plate 26 which is perforated as at 27 to allow the passage therethrough of the piston rod 20, the said perforation permitting a slight opening about the piston rod when the same is in position therein.

In the normal position of the parts as shown in the drawing, the piston head 21 is spaced apart from the end 26 of the inner casing and is of such diameter as to permit a slight clearance between its periphery and the walls of the inner casing as indicated by the numeral 28. The lower ends of the casing are filled with a fluid, preferably a liquid such as oil, the oil rising in the normal position of the parts above the piston head so as to immerse the piston head and fill the lower ends of both casings.

It will be observed that the oil or other liquid used may pass the piston head in either direction and likewise may pass from the chamber in the outer casing to the chamber in the inner casing and vice versa.

At its upper end the inner casing is closed by a suitable member, as for instance the plug 29, which is suitably secured in the casing, as for instance by means of the interengaging threads provided on the casing and the plug, as indicated at the numeral 30, the said plug being provided with a vent as shown at the numeral 31. The upper face of the plug is provided with a pair of spaced-apart lugs 32—32 suitably perforated for the passage of the pin 33 which extends through the opening 34 provided at the outer terminal of the spring 11, the said pin being secured against accidental displacement by suitable means, as for instance the cotters 35—35. The end of the spring 11 extends through the opening at the upper end of the outer casing, which is provided with a closure member or cap 36 secured thereon. Similarly to the body spring 11, the running gear spring 12 is provided at its rear end with an opening 37 for the passage of a pin 38 which is connected to the outer casing so as to engage the spring 12 to said casing. Thus the running gear spring is secured to the outer casing and the body spring to the inner casing in the manner hereinbefore described. The springs 18 and 19 are mounted at their lower end against the piston head 21 and at their upper end against the closure plug 29 of the inner casing.

The springs within the inner casing may be of such strength as to make the shock absorber substantially inactive during ordinary relative movement between the vehicle body and its running gear, the slight changes being cared for by the action of the springs 11 and 12 which are connected at their rear ends through the medium of the shock absorbing member; but upon movement sufficient to compress the springs within the shock absorber it will be apparent that these members will absorb shock in the following manner.

On movement of the body toward the running gear, the lower spring will exert an upward pull upon the outer casing, and the upper spring 11 a downward thrust upon the inner casing. On such movement the springs within the inner casing will be compressed and meanwhile the inner casing will travel downwardly in the outer casing, its downward movement being resisted by the springs seated against the piston head. In this movement the piston head will be in a stationary position in reference to the outer casing, being held in such position by means of the piston rod hereinbefore described. Meanwhile, the fluid or liquid within the outer casing will flow through the perforation 27 into the inner casing. On recovery or upon separating movement of the body and running gear, the inner casing will move upwardly in reference to the outer casing and the action of the spring will be dampened by the return flow of the fluid or liquid through the aperture 27, which flow may be eased by a communication between the fluid below the piston head in the inner chamber and that above the same. In this movement of the parts, and in the adjustment of the flow between the fluid in the chamber in the outer casing and the chamber in the inner casing, the piston head is permitted to adjust itself thereto through being moved upwardly in reference to the outer chamber, and the piston rod lifted within the seat 24 provided in the lower cap 22 of the outer casing 16. The filling and the exhaustion of air in the inner chamber is provided for by means of the vent 31 hereinbefore described.

It will be obvious that nice fits of the piston rod and of the piston head within the chambers are not required, and that the device will quickly absorb the shocks transmitted to it through the vehicle spring.

It will also be apparent that recovery shocks will be avoided through the means provided for dampening the action of the springs within the shock absorbing member 15.

I claim:

1. In a shock absorbing mechanism for vehicles, the combination with an outer casing, of an inner casing slidingly mounted therein; a spring within the inner casing; a fixed seat for one end of said spring; a movable seat for the other end of said spring, the movable seat being provided with a stem extended from the inner casing and engaging the outer casing, the movable spring seat being stationary in respect to the outer casing on compression of the spring.

2. In a shock absorber for vehicles, in combination: an outer casing; an inner casing slidingly mounted therein; a spring within the inner casing; and seats for said spring in said casing, one of said seats being movable, the movable seat having means whereby the same is held stationary in respect to the outer casing on compression of the spring.

3. In a shock absorber for vehicles, in combination: an outer casing; an inner casing slidingly mounted therein; a spring within the inner casing; seats for said spring, one of said seats being movable; and a stem extending from said seat through the inner casing and engaging the outer casing, the movable seat being stationary in respect to the outer casing on inward movement of the inner casing and adapted to be moved in reference to the outer casing on outward movement of the inner casing.

4. In a shock absorber for vehicles, a body spring and a running gear spring; an outer casing attached to one of said springs; an inner casing attached to the other of said springs, the inner casing having a spring mounted therein; a seat for one end of said spring; a piston head seated against the other end of said spring, the piston head being provided with a stem, the stem extending through the inner casing and engaging the outer casing, the inner casing having one end normally spaced from the corresponding end of the outer casing; a liquid in both of said casings, and means permitting the passage of the liquid from one casing into the other casing.

5. In a shock absorber for vehicles, a body spring and a running gear spring; an outer casing attached to one of said springs; an inner casing attached to the other of said springs, the inner casing having a spring mounted therein; a seat for one end of said spring; a piston head seated against the other end of said spring, the piston head being provided with a stem, the stem extending through the inner casing and engaging the outer casing, the inner casing having one end normally spaced from the corresponding end of the outer casing; a liquid in both of said casings, and means permitting the passage of the liquid from one casing into the other casing and immersing the piston head.

6. In a shock absorber for vehicles: a pair of internested casings, one adapted to be attached to the running gear of a vehicle and the other to the vehicle body, the inner casing having a spring and a piston head therein, the piston head being provided with a stem, the inner casing having an orifice for the passage of said stem, and the outer casing a seat for the end of said spring, the spring being seated at one end against the piston head and having a seat at its other end, the orifice for the piston stem being larger than the stem, both of said casings having a liquid therein adapted to flow through the said orifice on relative movement of the casings.

7. In a shock absorbing device for vehicles: inner and outer casings, one adapted for attachment to the running gear of a vehicle and the other to the vehicle body, one end of each of said casings being closed, the closed end of the inner casing being spaced apart from the closed end of the outer casing; a liquid in both of said casings; a piston head in the inner casing; a stem extending therefrom through the inner casing and engaging the outer casing; a spring within the inner casing seated at one end against the piston head and having a seat at its opposed end, the liquid in the inner casing surrounding the piston head; and passages for said liquid from one side of said piston head to the other and from the inner casing to the outer casing.

8. In a shock absorbing device for vehicles: internested casings; means for attaching one of said casings to the running gear of a vehicle and for attaching the other casing to the body of the vehicle, the inner casing being provided with a spring seat; a spring against said seat; a piston head within the casing engaging the other end of the spring; a stem upon the piston head, an orifice in the end of the inner casing for the passage of said stem; a seat in the end of the outer casing to receive the end of the stem; liquid in the outer casing between one end and the adjacent end of the inner casing; liquid within the inner casing; and a passage for the liquid to flow from one casing to the other, the piston head being immersed in the liquid, the said piston head being stationary in reference to the outer casing on compression of the springs and the liquid supporting the piston head on the recoil of the springs whereby the spring may be dampened.

9. In a shock absorber for vehicles: an outer casing and an inner casing; means for securing one of said casings to a vehicle running gear and the other to the vehicle body, the inner casing having a spring mounted therein; a fixed seat for the said spring at one end and a movable seat at its other end; a liquid in the inner casing, and means permitting the passage of the liquid from one side of the movable seat to the other.

10. In a shock absorber for vehicles: a pair of internested casings; a pair of vehicle springs, one attached to each of said casings; a spring within the inner casing; a fixed seat for one end of the spring; a movable seat for its other end; means for holding the movable seat stationary with respect to the outer casing on compression of the spring; a liquid between one end of the outer casing and the adjacent end of the inner casing; a liquid within the inner casing supporting the movable spring seat; means for the passage of the liquid from one casing into the other; a closure for the outer casing at one end and a closing cap at its other end, the closing cap being provided with apertures for the passage of the vehicle spring.

In witness that I claim the foregoing I have hereunto subscribed my name this 29th day of Aug., 1917.

JOHN F. O'CONNOR.